M. WILLE.
ROLLER BEARING AXLE.
APPLICATION FILED JUNE 23, 1908.

946,182.

Patented Jan. 11, 1910.

Witnesses:
W. C. Smith
A. L. Ekvall

Inventor:
Martin Wille,
By Joshua R. H. Potts
Attorney.

UNITED STATES PATENT OFFICE.

MARTIN WILLE, OF CHICAGO, ILLINOIS.

ROLLER-BEARING AXLE.

946,182.

Specification of Letters Patent.   Patented Jan. 11, 1910.

Application filed June 23, 1908. Serial No. 439,951.

*To all whom it may concern:*

Be it known that I, MARTIN WILLE, a citizen of the United States, residing at Chicago, county of Cook, and State of Illinois, have invented certain new and useful Improvements in Roller-Bearing Axles, of which the following is a specification.

My invention relates to improvements in roller-bearing axles of the class suitable for use in carriages and wagons.

The object of my invention is to provide in a hub and axle, anti-friction and dust-proof bearings that will be simple in construction and reliable in use.

With these objects in view my invention consists in a hub and axle and a plurality of rolls interposed and adapted to reduce the bearing friction to a minimum. The bearing surfaces of the hub, axle and rolls are conical which if extended would meet at a common apex. It is therefore obvious that sliding friction is eliminated and that the elements of the bearing have a true rolling contact. The rolls are adapted to extend nearly the entire length of the axle-arm making a long line contact, thereby tending to make a durable bearing.

The invention further consists in a dust-proofing means which will be hereinafter clearly set forth.

Figure 1:
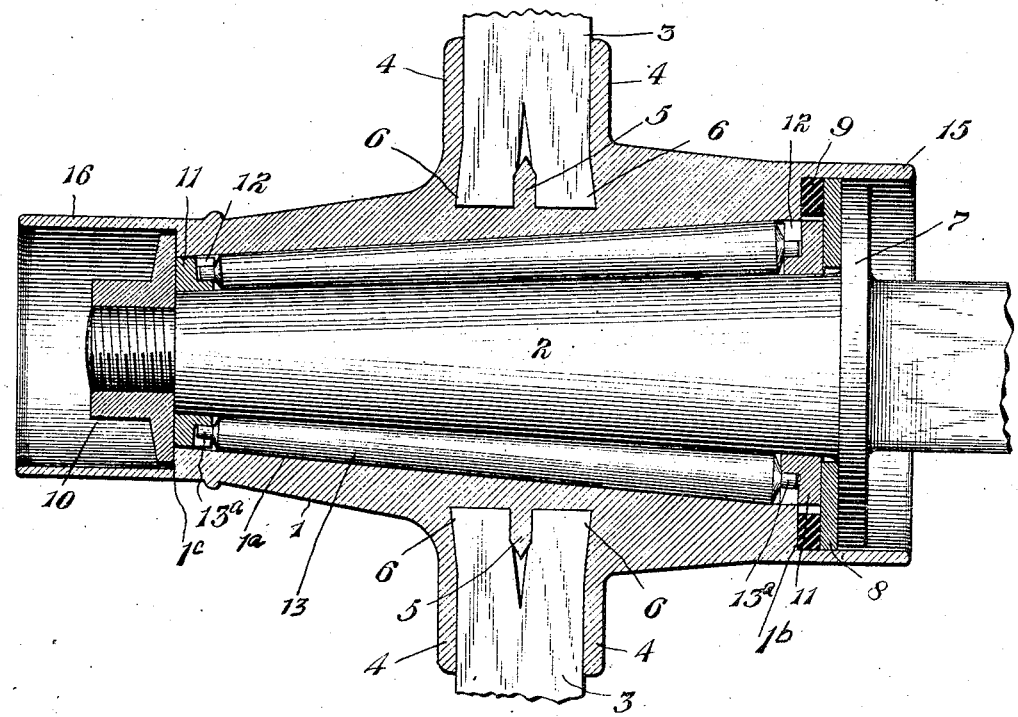
Figure 2:
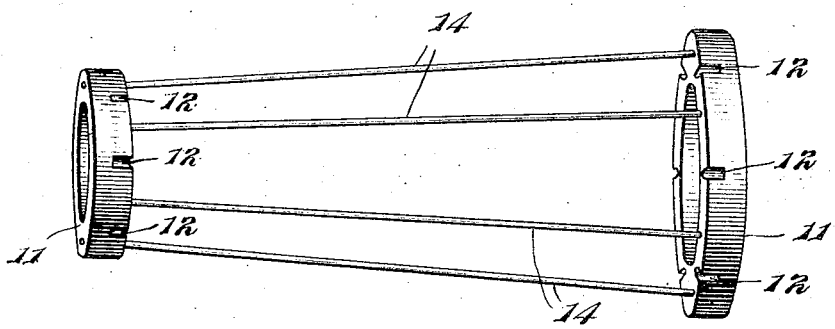

The preferred form of my invention is illustrated in the accompanying drawings forming a part of this specification, and in which, Figure 1 is a side elevation of the axle-arm and a central longitudinal section of the hub, and Fig. 2 is a perspective view of the roller cage.

Referring to the drawings, 1 indicates a hub, and 2 an axle-arm or spindle upon which the hub is journaled. The spokes 3 are secured between the hub flanges 4 and are locked by means of the central flange 5 and the widened portions 6 in the peripheral groove between the spoke flanges 4 as shown. Thus the construction of the hub is ideal as there are no bolts or rivets to detract from its general appearance.

The hub 1 is preferably a single casting of suitable metal. The inner bearing surface 1ª of the hub is conical as is also the spindle 2, and these are of such contour that if extended the surfaces would meet in a common apex. The bore of the hub is shouldered as at 1ᵇ and 1ᶜ forming vertically disposed annular bearing surfaces and the annular flanges or extensions 15 and 16 which project beyond the bearings in both directions.

Interposed between the spindle 2 and the bearing surface 1ª of the hub is a roller bearing cage formed of the end members 11—11 and the connecting rods 14, and in which the antifriction rollers 13 are mounted. The rollers 13 are conical and their outer surfaces if produced would converge in a common apex with the spindle 2 and the surface 1ª of the hub, thus forming a perfect rolling contact between the parts. The ends of the rollers 13 are reduced, forming journals 13ª which are mounted in radially disposed slots in the end members 11 of the cage. The members 11 are annular metal members which fit snugly upon the spindle and the slots 12 extend only part way through said members leaving the outer faces unbroken, which in a large measure prevents dust and grit from accumulating in the bearings. The usual collar 7 is provided between the spindle 2 and the axle proper which fits within the flange 15 and a thrust washer 8 of suitable hard metal is provided between the collar 7 and the inner cage member 11. A packing and dust-proofing washer 9 preferably of rubber is securely seated against the inner shoulder 1ᵇ of the hub 1 as shown and securely closes the space between said shoulder, the washer 8 and the periphery of the adjacent member 11. The usual retaining nut 10 screwed to the spindle is provided and the cage is held between said nut and the washer 8. The connecting-rods 14 are adapted to secure the end portions of the cage 11 and to maintain the rolls in proper alinement. The cage and rollers rest entirely within the conical portion of the hub bore and the thrust members 8, 9 and 10 are entirely within the enlarged cylindrical portions defined by the flanges 15 and 16 and bear against the shoulders 1ᵇ and 1ᶜ respectively.

Having described my invention what I claim as new and desire to secure by Letters Patent, is:

In a device of the class described, an axle spindle having a collar at one end and a nut threaded upon the other end in combination with a hub having a bore of greater diameter than that of the spindle, a roller bearing cage mounted on said spindle, rollers in said cage forming a bearing between the spindle and said hub, said hub being provided with internal outwardly faced shoulders near each end, one of said shoulders bearing against said nut, a metallic washer and soft packing interposed between said collar and the opposite shoulder, said soft packing surrounding the inner end of said cage and said washer and said nut bearing against the respective ends of said cage, substantially as described.

In testimony whereof I have signed my name to this specification in the presence of two subscribing witnesses.

MARTIN WILLE.

Witnesses:
ARTHUR A. OLSON,
WILLIAM C. SMITH.